United States Patent
Shaheen

(10) Patent No.: US 10,856,186 B2
(45) Date of Patent: Dec. 1, 2020

(54) METHOD AND SYSTEM FOR USER INITIATED INTER-DEVICE, INTER-SYSTEM, AND INTER-INTERNET PROTOCOL ADDRESS HANDOFF

(75) Inventor: Kamel M. Shaheen, King of Prussia, PA (US)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 1355 days.

(21) Appl. No.: 12/346,258

(22) Filed: Dec. 30, 2008

(65) Prior Publication Data
US 2009/0103495 A1    Apr. 23, 2009

Related U.S. Application Data

(63) Continuation of application No. 10/653,577, filed on Sep. 2, 2003, now Pat. No. 7,480,721.
(Continued)

(51) Int. Cl.
*H04W 36/00* (2009.01)
*H04L 29/08* (2006.01)
(Continued)

(52) U.S. Cl.
CPC ......... *H04W 36/0011* (2013.01); *H04L 67/14* (2013.01); *H04W 80/00* (2013.01);
(Continued)

(58) Field of Classification Search
CPC .............. H04L 67/14; H04W 36/0005; H04W 36/0011; H04W 36/0022
(Continued)

(56) References Cited

U.S. PATENT DOCUMENTS

| 5,845,212 A | 12/1998 | Tanaka |
| 5,978,679 A | 11/1999 | Agre |

(Continued)

FOREIGN PATENT DOCUMENTS

| EP | 1 204 250 | 7/2000 |
| EP | 1 204 250 | 5/2002 |

(Continued)

OTHER PUBLICATIONS

"$3^{rd}$ Generation Partnership Project; Technical Specification Group Services and System Aspects; 3GPP system to Wireless Local Area Network (WLAN) Interworking; System Desciption (Release 6)." 3GPP TS 23.234 v1.1.0 (Oct. 2002).

(Continued)

*Primary Examiner* — Chris Parry
*Assistant Examiner* — Adam A Cooney
(74) *Attorney, Agent, or Firm* — Volpe Koenig

(57) ABSTRACT

Apparatus and method by which Internet Protocol (IP) traffic can be transferred (i.e. handoff) between two different terminals operating according to two different technology standards in two different systems with two different IP addresses. For example, a session handoff can be made between a terminal in Wireless Local Area Network (WLAN) a terminal in a 3GPP UMTS or between a terminal in CDMA2000 and a terminal in a 3GPP UMTS. These terminals can be either physically separate entities or logical entities that are encapsulated within a common enclosure.

12 Claims, 9 Drawing Sheets

Related U.S. Application Data

(60) Provisional application No. 60/408,475, filed on Sep. 3, 2002.

(51) Int. Cl.

| | |
|---|---|
| *H04W 36/36* | (2009.01) |
| *H04W 36/14* | (2009.01) |
| *H04W 80/04* | (2009.01) |
| *H04W 88/02* | (2009.01) |
| *H04W 36/38* | (2009.01) |
| *H04W 80/00* | (2009.01) |
| *H04W 8/26* | (2009.01) |

(52) U.S. Cl.
CPC .............. *H04W 8/26* (2013.01); *H04W 36/14* (2013.01); *H04W 36/365* (2013.01); *H04W 36/38* (2013.01); *H04W 80/04* (2013.01); *H04W 88/02* (2013.01)

(58) Field of Classification Search
USPC ....................................................... 709/227
See application file for complete search history.

(56) References Cited

U.S. PATENT DOCUMENTS

| | | | |
|---|---|---|---|
| 6,201,962 | B1 | 3/2001 | Sturniolo et al. |
| 6,539,227 | B1 | 3/2003 | Jetzek et al. |
| 6,711,623 | B1 | 3/2004 | Furukawa et al. |
| 6,915,136 | B2 | 7/2005 | Kikuta et al. |
| 7,079,511 | B2 | 7/2006 | Abrol et al. |
| 2002/0019880 | A1* | 2/2002 | Sakakura ...................... 709/245 |
| 2002/0037726 | A1 | 3/2002 | Czaja et al. |
| 2002/0059452 | A1 | 5/2002 | Yokota et al. |
| 2002/0093922 | A1* | 7/2002 | Grilli et al. ................... 370/328 |
| 2002/0094805 | A1 | 7/2002 | Yano et al. |
| 2002/0105926 | A1 | 8/2002 | Famolari et al. |
| 2002/0118656 | A1 | 8/2002 | Agrawal et al. |
| 2003/0086390 | A1 | 5/2003 | Eschbach et al. |
| 2003/0088765 | A1* | 5/2003 | Eschbach et al. ............ 713/150 |
| 2003/0118049 | A1 | 6/2003 | Bender et al. |
| 2003/0142647 | A1 | 7/2003 | Agrawal et al. |
| 2005/0153697 | A1* | 7/2005 | Patel ............................ 455/442 |
| 2005/0246447 | A1 | 11/2005 | Smidt et al. |

FOREIGN PATENT DOCUMENTS

| | | |
|---|---|---|
| EP | 1 330 098 | 7/2003 |
| JP | 11-041644 | 2/1999 |
| JP | 11-094557 | 2/1999 |
| JP | 11-094557 | 4/1999 |
| JP | 11-285077 | 10/1999 |
| JP | 2000-341735 | 12/2000 |
| JP | 2001-028776 | 1/2001 |
| JP | 2001237869 A2 | 8/2001 |
| JP | 2002064562 A | 2/2002 |
| JP | 2002-094557 | 3/2002 |
| JP | 2002-095054 | 3/2002 |
| JP | 2002-218547 | 8/2002 |
| JP | 2003304251 A | 10/2003 |
| RU | 2258317 | 8/2005 |
| WO | 02/43348 | 5/2002 |

OTHER PUBLICATIONS

Third Generation Partnership Project, "Technical Specification Group Services and System Aspects; IP Multimedia Sybsystem (IMS); Stage 2 (Release 5)," 3GPP TS 23.228 V5.5.0 (Jun. 2002).

"3$^{rd}$ Generation Partnership Project; Technical Specification Group Services and System Aspects; 3GPP system to Wireless Local Area Network (WLAN) Interworking; System Description (Release 6)." 3GPP TS 23.234 v1.1.0 (Oct. 2002).

Imai et al., "Service Mobility Support in Ubiquitous Environment," Proceedings of General Conference 2002 of Institute of Electronics, Information and Communication Engineers, p. 240 (Mar. 7, 2002).

Jeong et al., "Bringing Flexibility into Ubiquitous Personal Networks," Proceedings of the IEICE General Conference, pp. 13-14 (2001).

Kaneko et al., "End-to-End Mobility Support for Heterogeneous Internet Environments," Technical Report of IEICE, pp. 45-50 (May 17, 2002).

Kunito et al., "A Design and Implementation of Personal Mesh for Heterogeneous Access Link Environments," Technical Report of IEICE (Mar. 2002).

Kunito et al., "Personal Mesh for Heterogeneous Link Environment," Proceedings of General Conference 2002 of Institute of Electronics, Information and Communication Engineers, p. 239 (Mar. 7, 2002).

Li et al., "Supporting Personal Mobility for Nomadic Computing Over the Internet", Mobile Computing and Communications Review, vol. 1, No. 1, Apr. 1997, pp. 22-31.

Third Generation Partnership Project, "Technical Specification Group Services and System Aspects; IP Multimedia Subsystem (IMS); Stage 2 (Release 5)," 3GPP TS 23.228 V5.9.0 (Jun. 2003).

Third Generation Partnership Project, "Technical Specification Group Services and System Aspects; IP Multimedia Subsystem (IMS); Stage 2 (Release 5)," 3GPP TS 23.228 V5.5.0 (Jun. 2002).

Third Generation Partnership Project, "Technical Specification Group Services and System Aspects; IP Multimedia Subsystem (IMS); Stage 2 (Release 6)," 3GPP TS 23.228 V6.2.0 (Jun. 2003).

Third Generation Partnership Project, "Technical Specification Group Services and System Aspects; Service requirements for the IP Multimedia Core Network Subsystem (Stage 1) (Release 5)," 3GPP TS 22.228 V5.6.0 (Jun. 2002).

Third Generation Partnership Project, "Technical Specification Group Services and System Aspects; Service requirements for the Internet Protocol (IP) multimedia core network subsystem; Stage 1 (Release 6)," 3GPP TS 22.228 V6.0.0 (Jun. 2002).

Third Generation Partnership Project, "Technical Specification Group Services and System Aspects; Service requirements for the Internet Protocol (IP) multimedia core network subsystem; Stage 1 (Release 6)," 3GPP TS 22.228 V6.3.0 (Jun. 2003).

Zou, Bo, "Mobile ID Protocol: A Badge-Activated Application Level Handoff of a Multimedia Streaming to Support User Mobility", Thesis for the Degree of Master of Science in Computer Science, (Online) 2000, Urbana Illinois USA. URL: http://cairo.cs.uiuc.edu/publications/view.php?action=list&area=all&type=master>.

Schulzrinne et al., "Application—Layer Mobility Using SIP," 2000 Workshop on Service Portability, (Dec. 1, 2000).

Nakanishi et al., "A Study on Handover technologies in Ubiquitous networks," Proceedings 2 of the 2002 IEICE Communications Society Conference, SB-4-10, The Institute of Electronics, Information and Communication Engineers (Aug. 20, 2002).

Ohta et al., "Adaptive Mobile Terminal Architecture for Seamless Service," Proceedings of the Symposium on Multimedia, Distribution, Cooperation and Mobile (DICOMO), IEICE (Jun. 27, 2001).

Ohta et al., "Mobile Multimedia Middleware for Seamless Service," IPSJ SIG Notes, No. 83, IPSJ (Sep. 6, 2001).

Tsuda et al., "Mobile Wearable Intelligence," Journal of Japanese Society for Artificial Intelligence, vol. 16, No. 6, Japanese Society for Artificial Intelligence, pp. 756-761 (Nov. 1, 2001).

* cited by examiner

METHOD AND SYSTEM FOR USER INITIATED INTER-DEVICE, INTER-SYSTEM, AND INTER-INTERNET PROTOCOL ADDRESS HANDOFF

CROSS REFERENCE TO RELATED APPLICATION(S)

This application is a continuation of U.S. patent application Ser. No. 10/653,577, filed Sep. 2, 2003, which claims the benefit of U.S. Provisional Application Ser. No. 60/408,475 and filed Sep. 3, 2002, which is incorporated by reference as if fully set forth.

BACKGROUND

Internet Protocol (IP) traffic can typically be transferred (i.e. handoff) when dealing with a single terminal operating with the same system and employing the same IP address. Some systems can accommodate a single terminal operating between systems and wherein the IP addresses may be different. However, there are no systems which provide the capability of transferring an existing session between two terminals, in which two systems and two different IP addresses are involved.

SUMMARY

A transfer (i.e. handoff) of internet protocol (IP) traffic between two different terminals operating under two different technology standards and in two different systems with two different IP addresses may be either subscriber initiated voluntarily or subscriber-initiated responsive to network solicitation, wherein the handoff process is effected employing optimizing routing mobile IP-(MIP).

BRIEF DESCRIPTION OF THE DRAWING(S)

The present invention will be understood from a consideration of the accompanying description and drawings wherein like elements are designated by like numerals and wherein.

DETAILED DESCRIPTION OF THE PREFERRED EMBODIMENT(S)

Figure 1:
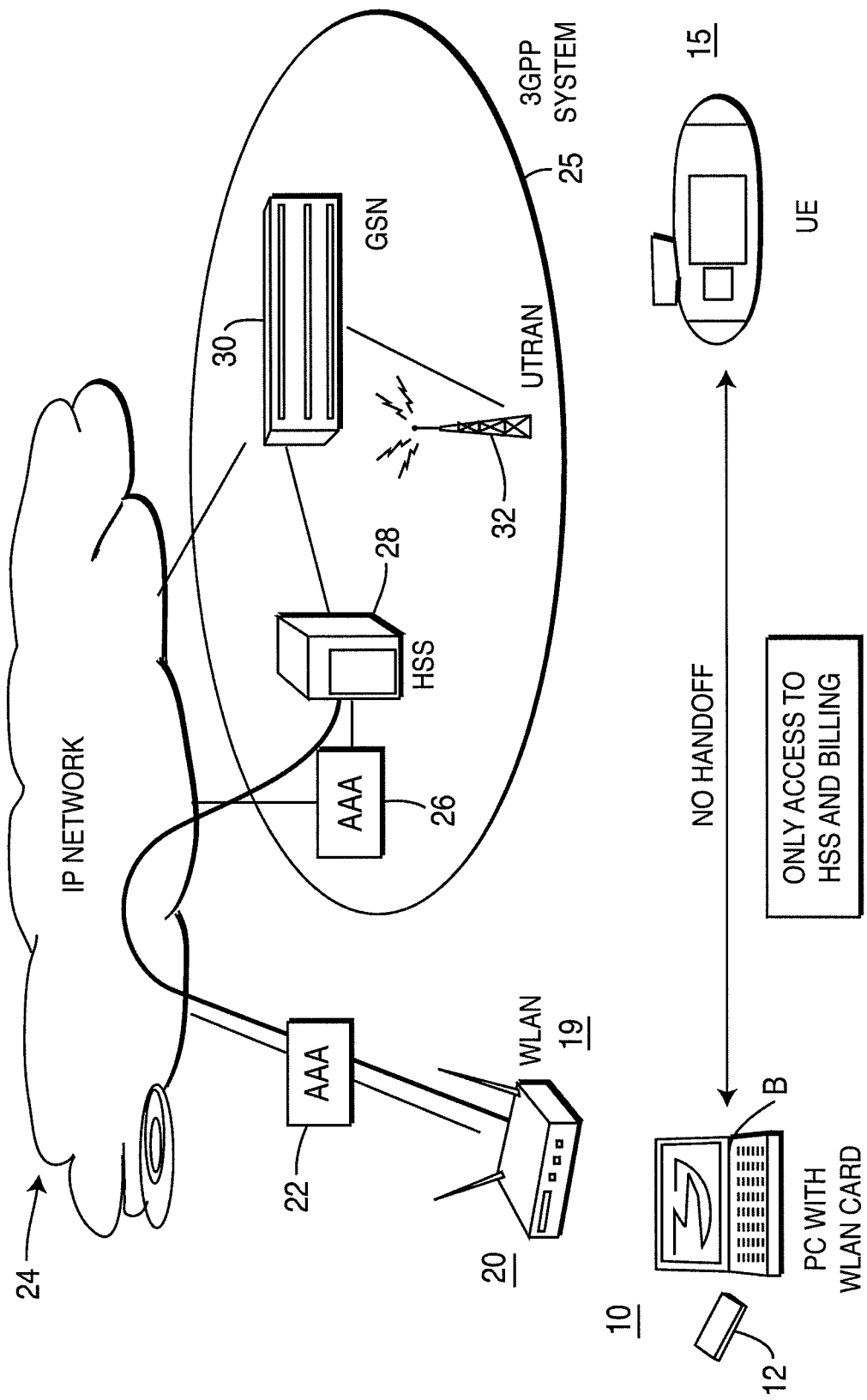
FIG. 1 is a system diagram of the interworking approved Scenario 2.

The present invention discloses apparatus and method wherein Internet Protocol (IP) traffic can be transferred (i.e., handoff) between two different terminals operating according to two different technology standards in two different systems with two different IP addresses. For example, session handoff between a Wireless Local Area Network (WLAN) terminal and 3GPP UMTS terminal or between CDMA2000 terminal and 3GPP UMTS terminal. The invention may be utilized by terminals which can be either physically separate entities or separate logical entities that are encapsulated in a common enclosure.

The invention is based on the user (service subscriber) initiating handoff procedures between the two terminals. The subscriber may initiate the handoff process based on network solicitation (e.g., the network advises the user that WLAN coverage is available in this geographic vicinity) or based on unsolicited action by the subscriber (e.g., the subscriber is performing a transaction over WLAN and decides that he needs to leave the WLAN and continue the same transaction on his UMTS terminal).

There are several mechanisms by which the user initiates an application based handoff. For example, the software session (or the terminal itself) may include a button that triggers initiation of session handoff procedures. The session handoff trigger may also request the target system/terminal/IP address to which the session will be transferred. The request may be part of a stored program in the subscriber's terminal or alternatively be sent directly to the subscriber asking for the target IP address, terminal phone number, or terminal identification number. In a second approach, the source system queries the subscriber profile at the Home Location Registry/-Home Subscriber Service (HLR/HSS) to obtain the target address for handoff. If the subscriber has more than one terminal, the source system may request the subscriber to choose the desired target terminal. In a case where the desired terminal is switched off, the source system may ask the subscriber to switch the terminal ON and activate its IP connection (i.e., obtain the IP address or activate the packet data protocol (PDP) context) before proceeding with the handoff. In a case where the second terminal (e.g., UMTS) is attached and no IP address is allocated (i.e., inactive PDP context), the source system may trigger the target system to perform network initiated PDP context activation procedures.

When the target system, target terminal, and target IP address have been identified, the handoff process can be finalized using optimized routing mobile IP version 4 (MIPv4) to direct the session traffic directly to the target triplet (system, IP address, terminal). Once the traffic is rerouted to the new destination, the source system can advise the subscriber that the handoff is completed and that the subscriber can terminate this connection, and switch off the current terminal after which all resources can be released.

Setting forth the present invention in greater detail, and with reference to the drawings, FIG. 1 represents the present state of the art wherein a personal computer (PC) 10 having a WLAN card 12 is capable of communicating with an access point (AP) 20 of a WLAN 19. The WLAN 19 has only limited access to the 3rd generation partnership project (3GPP) system. The PC 10 communicates with an internet protocol (IP) network 24 to send and receive messages. However, PC 10 has access to the 3GPP system 25 only for authentication and billing through the AAA function 22 of the WLAN AP 20, the AAA function 26 of UTRAN 25 and the HSS 28. There is no capability of a handoff as between PC 10 and a wireless user equipment (UE) 15. The capability shown in FIG. 1 shows inter-working in accordance with approved Scenario 2. Although FIG. 1 shows the PC 10 and a user equipment 15 as separate entities, it should be understood that they may be logical entities contained with a common housing (not shown).

Figure 2:
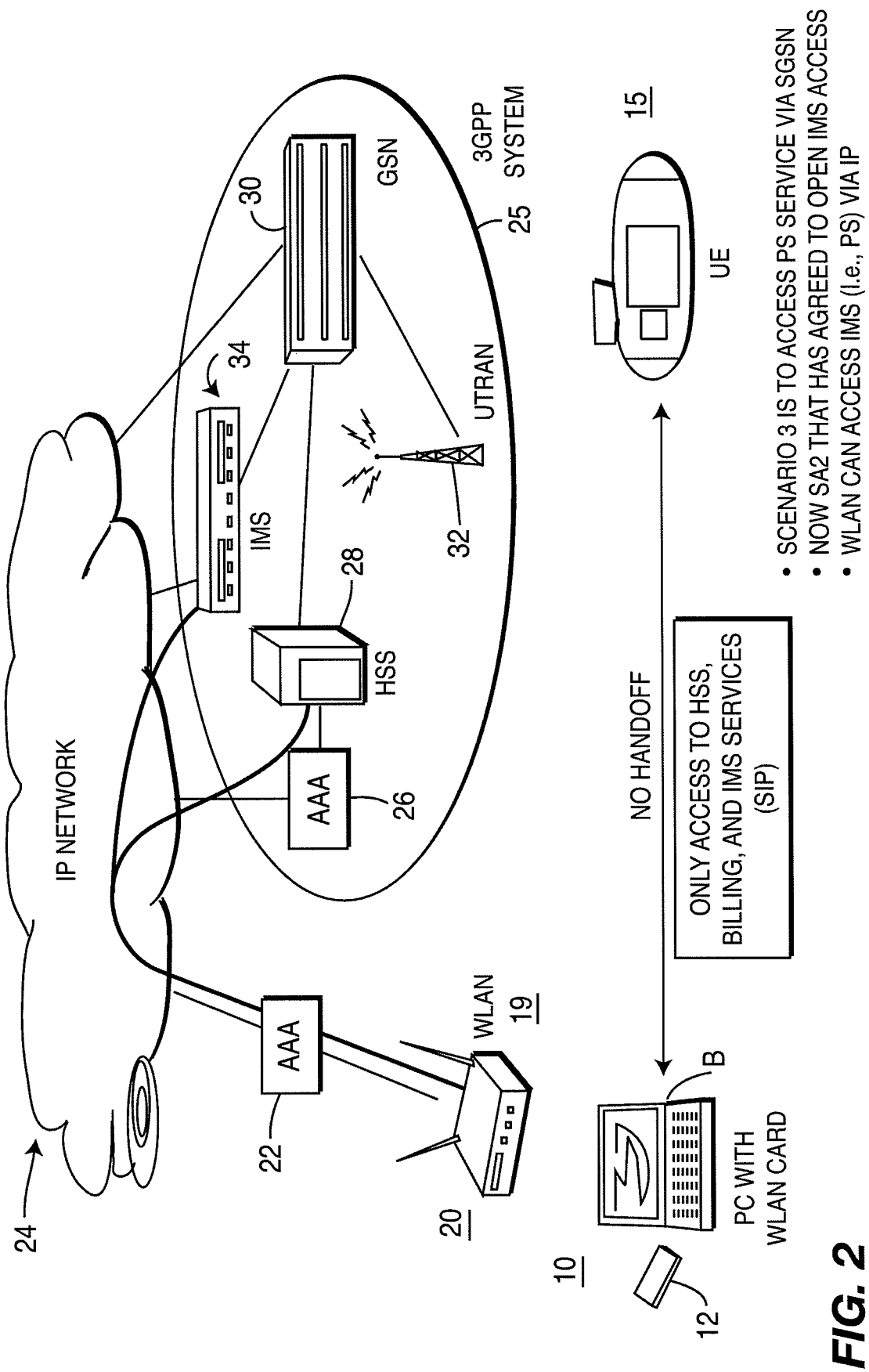
FIG. 2 is a system diagram of the interworking approach to Scenario 3.

FIG. 2 shows an interworking employing a new approach to Scenario 3, which differs from the arrangement shown in FIG. 2 with the addition of instant messaging system IMS 34. Scenario 3 provides access to packet switching (PS) service via the serving GSN (SGSN) forming part of GSN 30 in 3GPP system 25 in scenario 3. PC 10, in addition to having access to HSS 28 for authentication and billing, is further capable of obtaining instant message system (IMS) services through IP network 24, utilizing IMS 34. Nevertheless, there is no handoff capability between PC 10 and UE 15.

Figure 3:
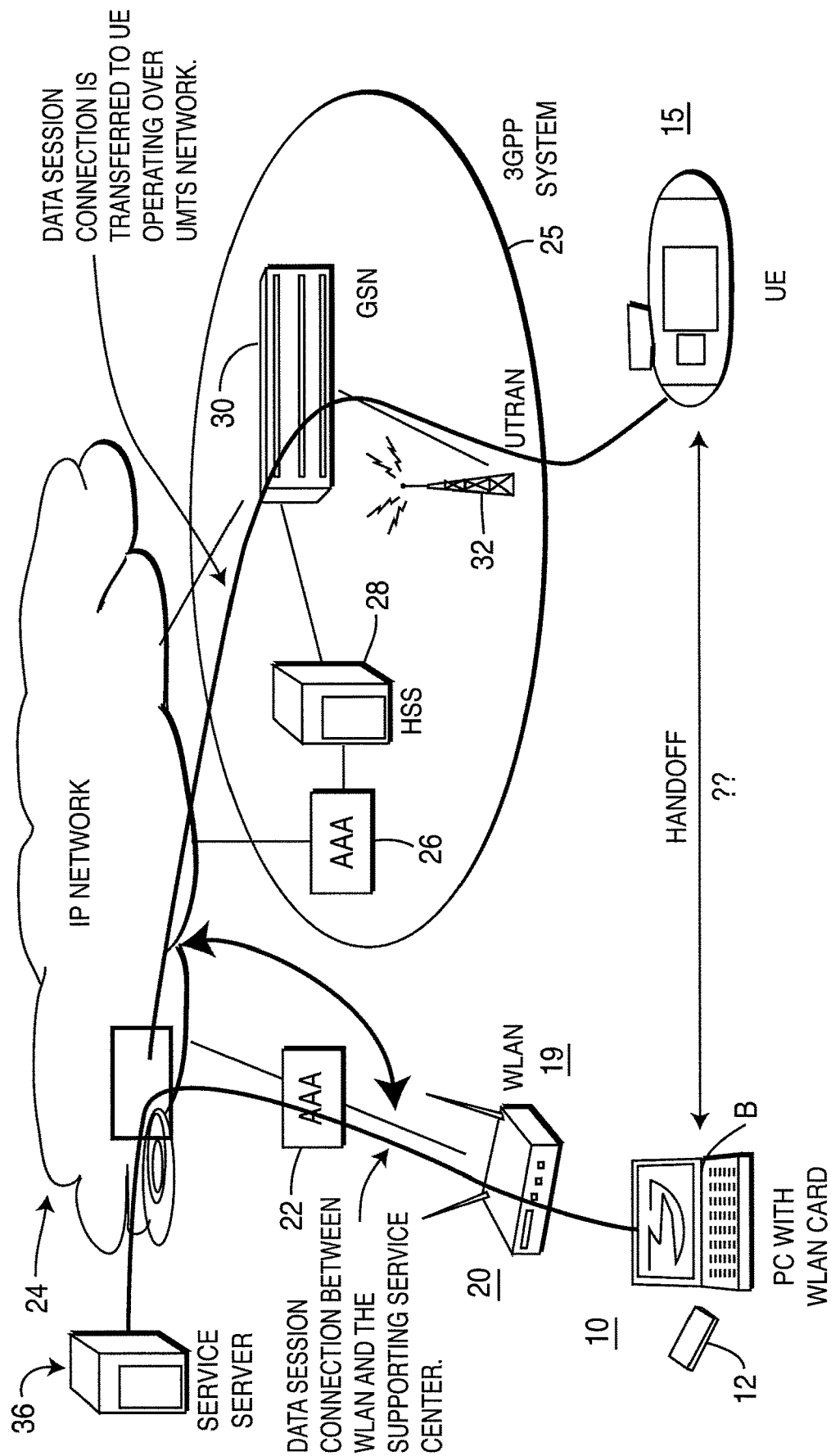
FIG. 3 is a system diagram illustrating how to achieve Handoff with this configuration without any changes to WLAN.

FIG. 3 shows an arrangement in which a handoff is achieved without any changes in the WLAN 20. PC 10 is shown conducting a data session between WLAN 20 and supporting service center (SC) 36 through IP network 24. The data session connection is transferred to UE 15 operating wirelessly over the UMTS network of the 3 GPP system 25 over tower 32.

Figure 4:
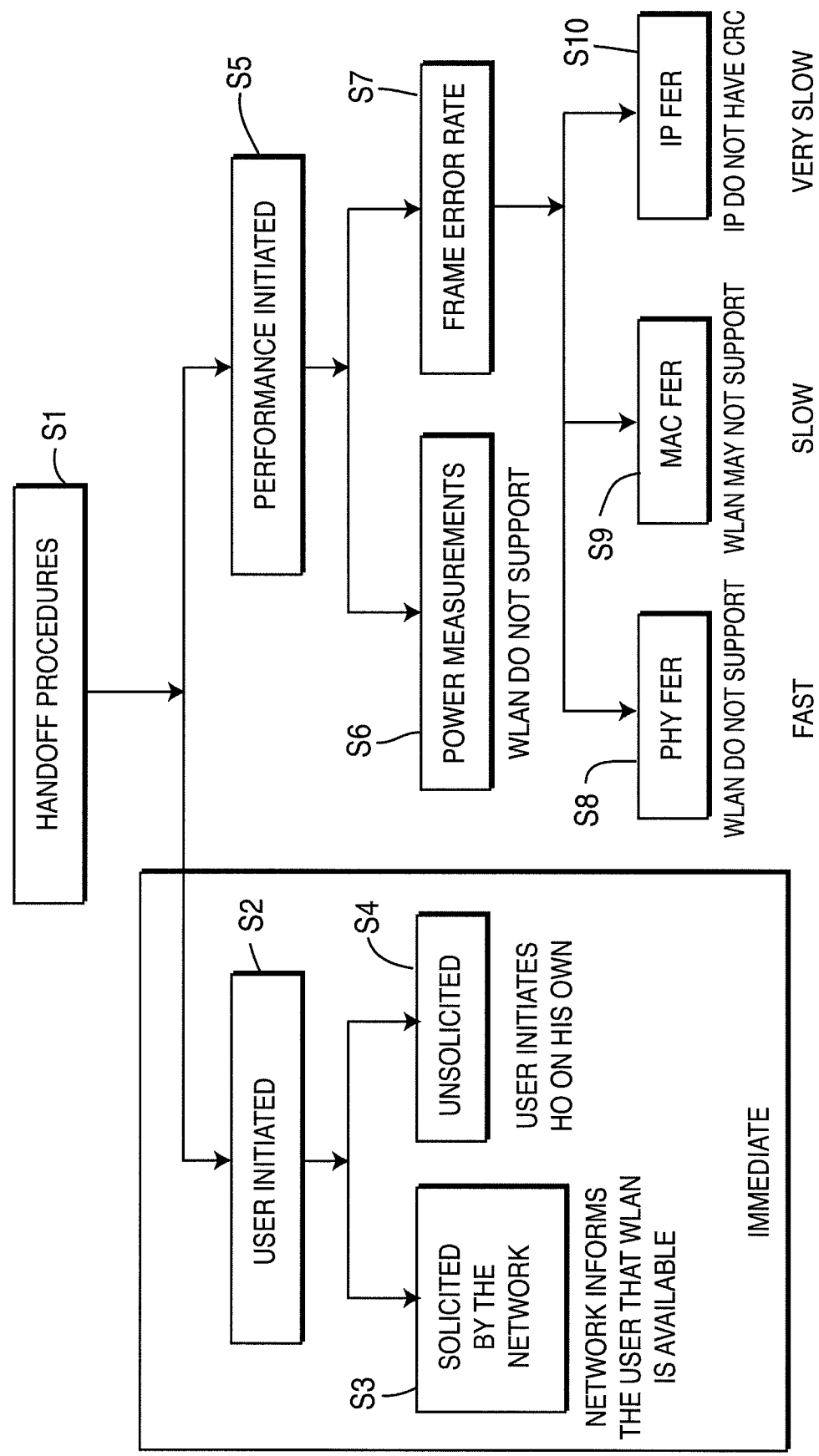
FIG. 4 is a block listing of Handoff Triggers.

FIG. 4 is a flow diagram showing available handoff procedures.

A handoff procedure is triggered (see step S1) and may either be user-initiated or performance-initiated. Given a user-initiated handoff (S2) the initiation may be solicited by the network (branching to S3) wherein the network informs the user that the network, for example, a WLAN, is available. In the case of an unsolicited handoff trigger, the user may initiate the handoff (HO) on his own. In either the solicited (S3) or unsolicited (S4) handoff trigger, the handoff is immediate.

An HO may be performance-initiated (branching from S1 to S5) wherein initiation may be based upon a power measurement (branching to S6). However, WLANs do not presently support a performance-initiated HO based on power measurement.

An HO may be initiated based on frame error rate (FER) branching from S5 to S7. However, a physical layer FER (PHY FER) is not supported by a WLAN. A medium access control FER (MAC FER) may not be supported by a WLAN and results in a slow procedure.

An internet protocol FER (IP FER) results in a very slow handoff and it should further be noted that the internet protocol (IP) does not have cyclic redundancy check (CRC).

Figure 5:
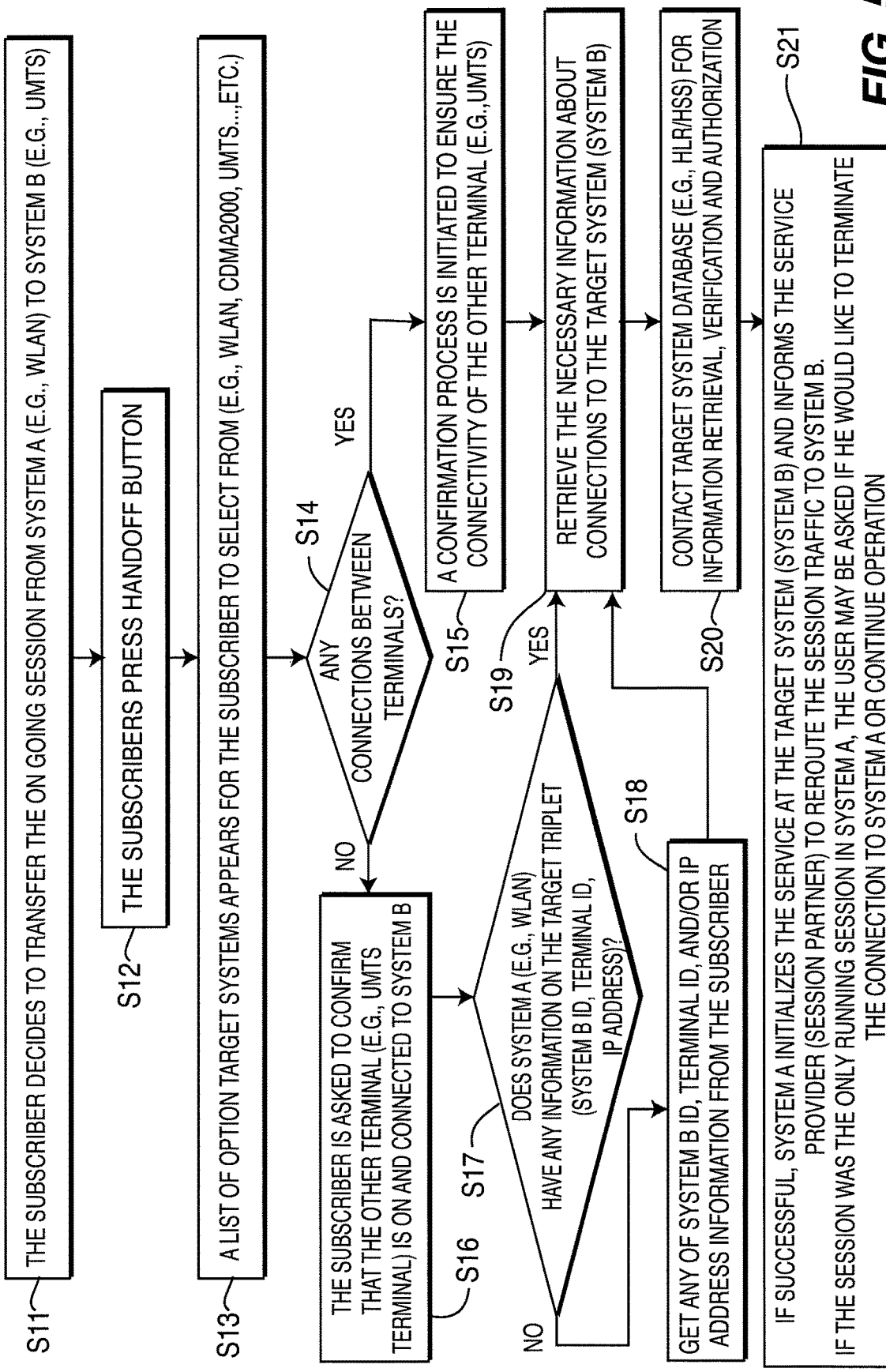
FIG. 5 is a method flow illustrating general handover scenario (with target HLR/HSS access)

FIG. 5 is a flow diagram showing a generalized HO scenario employing target home location register/home subscriber server (HLR/HSS) access. At step S11 an HO is initiated when a subscriber, which may, for example, be a PC equipped with a WLAN card, decides to transfer a current session from one system, A, which may, for example, be a WLAN, to a second system, B, which may, for example, be a universal mobile telecommunications system (UMTS). Upon making this decision, the subscriber operates a handoff button B provided as part of the subscriber unit, such as PC 10 shown in FIG. 3. Responsive to operation of the HO button, the subscriber is presented with a list of option target systems such as, for example, WLAN, CDMA 2000, UMTS, etc. (S13).

The routine advances to S14 at which time a determination is made as to whether there are any connections between terminals, such as PC 10 and UE 15 shown in FIG. 3. If there is a connection, the routine branches to S15 to initiate a confirmation process ensuring the connectivity of the other terminal, for example a UMTS.

In the event that there is no connection between terminals, the routine branches from S14 to S16 which asks the subscriber to confirm that the other terminal, for example, the terminal in the UMTS system is on and is connected with system B. The routine then advances to S17 to inquire if system A, such as for example a WLAN, has any information regarding the target triplet which includes the ID of system B, the ID of the terminal communicating with system B and the IP address. In the event that system A does not have the target triplet information, the subscriber is requested to provide the target information.

In the case where system A has the target information, the routine branches to S19 to retrieve the necessary information about the connections to the target system, i.e. system B. As is described above, the retrieved information is obtained either from system A or from the subscriber. The routine then advances to S20 wherein the target system data base, for example, the HLR/HSS, is contacted for information retrieval, verification and authorization. When the necessary criteria is present, the routine branches to S21 wherein system A initializes the service at the target system B and informs the service provider, i.e., the session partner to reroute the session traffic to system B. In the event the current session is the only running session in system A, an inquiry may be made to the subscriber to determine if the subscriber would like to terminate the connection to the system A or to continue operation.

Figure 6:
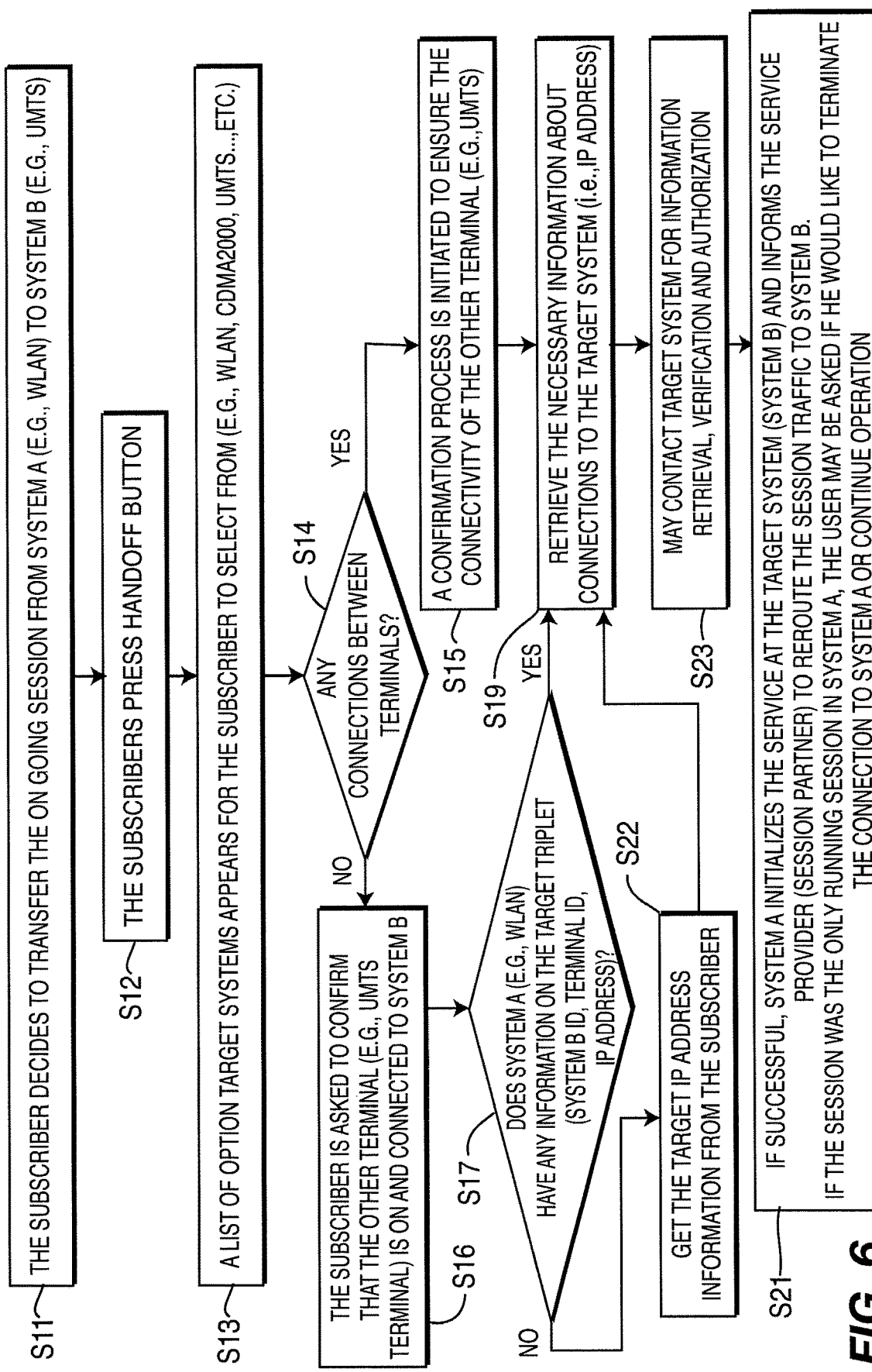
FIG. 6 is a method flow illustrating general handover scenario (with target HLR/HSS access)

FIG. 6 shows a generalized HO scenario in which a target HLR/HSS is omitted. For purposes of simplicity, only those steps which are not shown in FIG. 5 will be described in detail.

Steps S11 through S17 are substantially identical to the corresponding steps S11 through S17 shown in FIG. 5. However, at step S17, in the event that system A does not have the target triplet information, the routine branches to step S22 to obtain the target IP address information from the subscriber.

Advancing from step S15, the necessary information regarding connections to the target system are retrieved at S19, the target information either being obtained from system A (S17) or from the target address information provided by the subscriber (S22). The routine then branches to S23 wherein the target system may be contacted for information retrieval, verification and authorization. Thereafter if the appropriate criteria are met, the routine advances to step S21 which is substantially the same as corresponding step S21 in FIG. 5.

Figure 7:
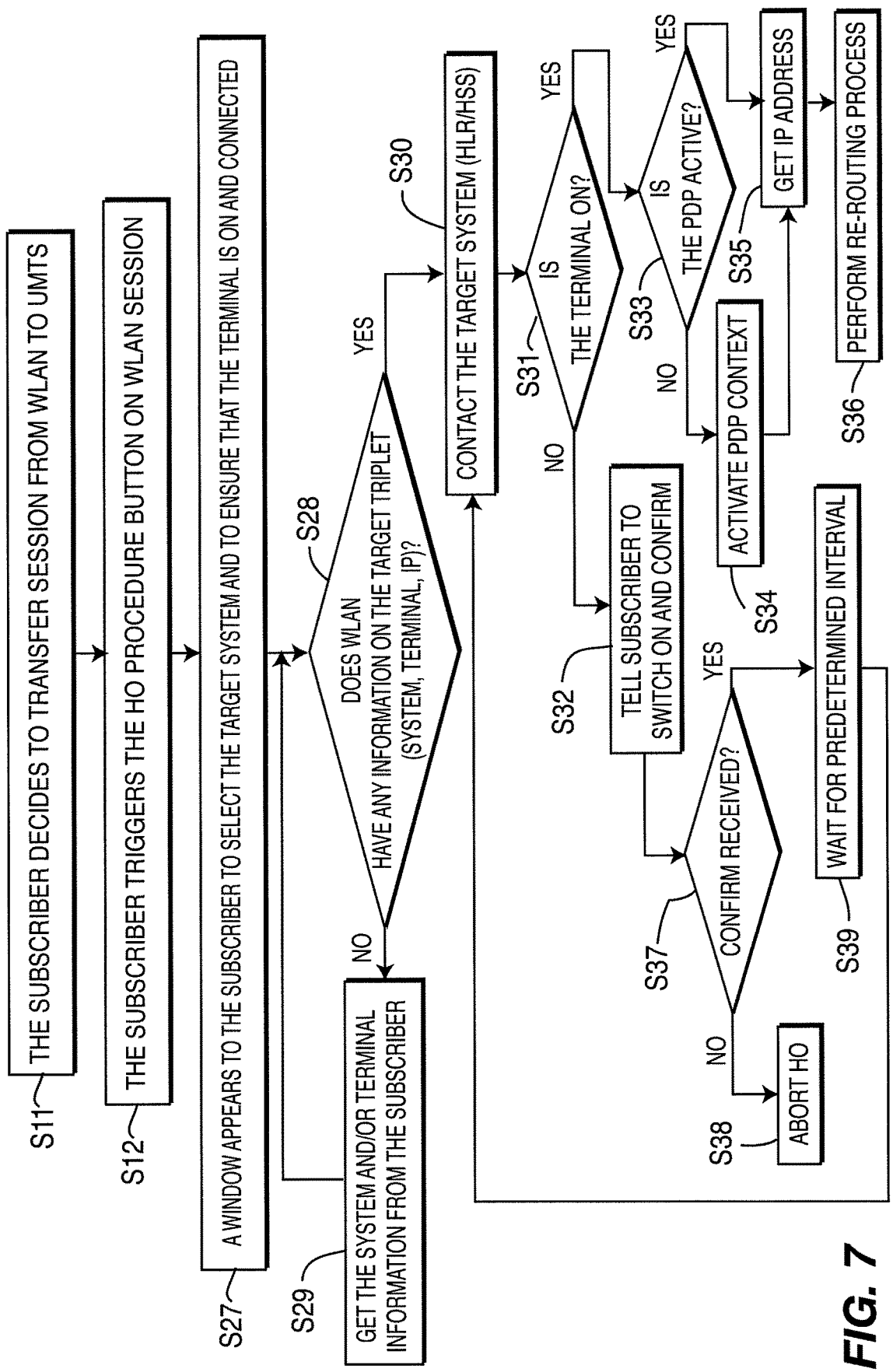
FIG. 7 is a method flow illustrating handover from WLAN to UMTS.

FIG. 7 shows an HO scenario from a WLAN to a UMTS. Steps S11 and S12 are substantially identical to the corresponding initial steps S11 and S12 of FIGS. 5 and 6. Upon operation of the HO initiation button, the routine advances to step S27, providing a window to the subscriber inviting the subscriber to select the target system from among the choices displayed and to further ensure that the terminal intended to communicate with the target system is on and connected. The routine then advances to step S28 which is substantially identical to step S17 shown in the routines of FIGS. 5 and 6 wherein an inquiry is made as to whether the WLAN has information regarding the target triplet. In the event that the UMTS does not have target triplet information, the routine branches to step S29 in order to obtain the system and/or terminal information from the subscriber. Returning to step S28, the routine loops here until the requested information is obtained. Although not shown, the routine may be exited in the event that the requested information is not obtained after a given number of tries, for example, three (3) tries. However, a lesser or greater number of tries may be programmed before aborting.

When the triplet information is obtained, the routine branches to step S30 whereupon the HLR/HSS of the target system is contacted. The routine advances to step S31 to determine if the terminal is on. In the event that the terminal is on, the routine branches to step S33 to determine if the packet data protocol (PDP) is active. In the event that the PDP is not active, the routine branches to step S34 to activate the PDP context and thereafter obtain the IP address (S35), followed by performing the re-routing process (S36).

Returning to S33, in the event that the PDP is active, the IP address is obtained (S35) and the rerouting process is performed (S36).

Returning to S31, if the terminal is not on, the routine branches to S32 requesting the subscriber to switch on and confirm. The routine advances to S37 to determine if the confirmation has been received. If the confirmation has been received, the routine branches to S39 wherein a predetermined delay is provided before the target system is contacted (S30).

In the event that a confirmation is not received, the routine branches to S38 and the HO is aborted.

Figure 8:
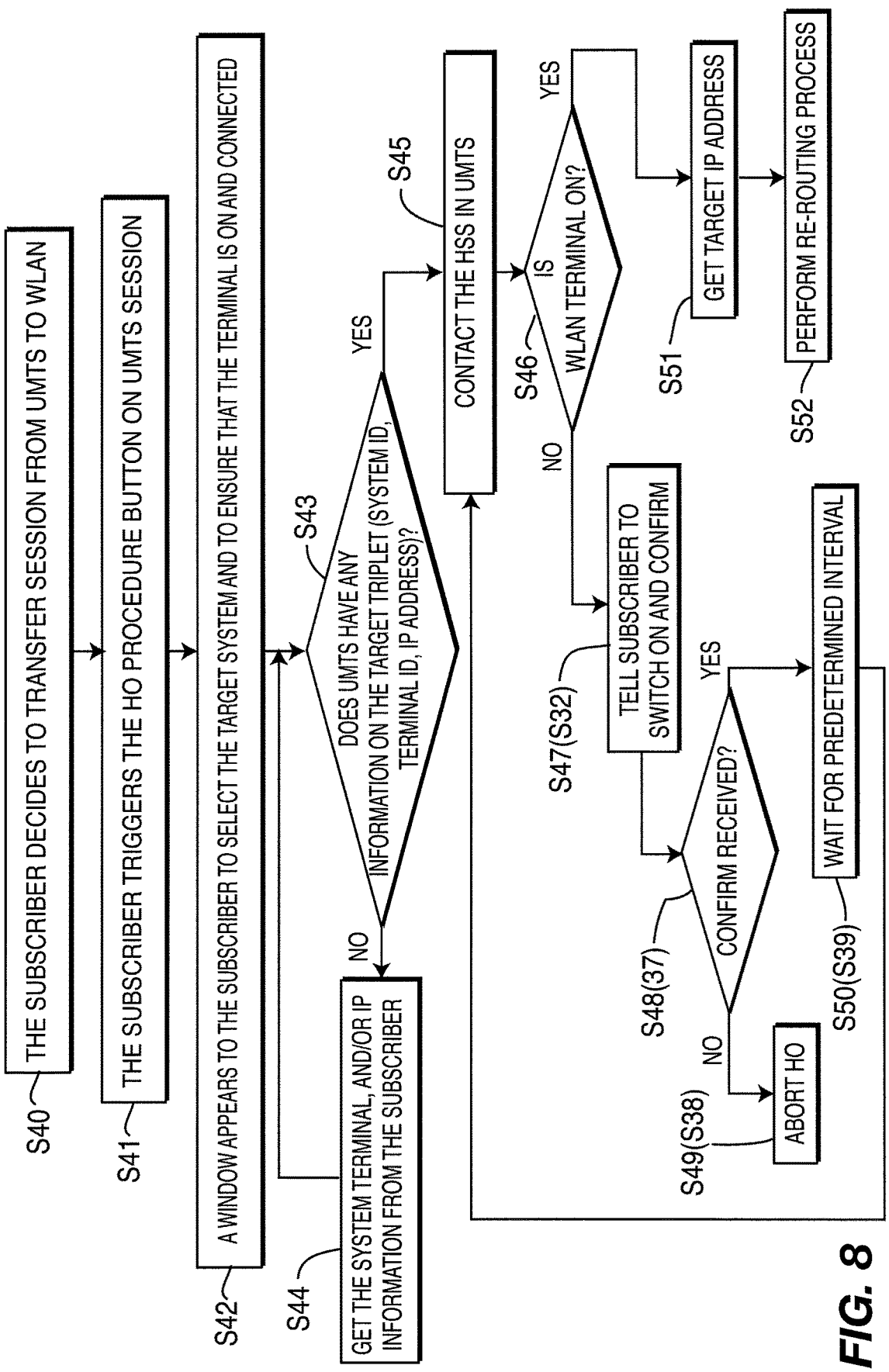
FIG. 8 is a method flow illustrating handover scenario from UMTS to WLAN (with Interworking)

FIG. 8 shows an HO scenario from a UMTS to a WLAN which utilizes interworking.

The HO routine is initiated when the subscriber makes a decision to transfer a current session from UMTS from WLAN (S40) and thereafter triggers the HO procedure button during the current UMTS session (S41), whereupon the subscriber is invited to select the target system from a display provided to the subscriber and is further alerted to assure that the terminal to be connected to the WLAN, for example, a PC with a WLAN card, is on and connected to the WLAN.

Thereafter, an inquiry is made as to whether the UMTS has the target triplet information. In the event that the UMTS does not have the target information, the routine branches to S44 to obtain the system terminal and/or IP information from the subscriber, looping back to S43. When the target information is available, the routine branches to S45 whereupon the HSS in the UMTS is contacted. The routine then advances to S46 to determine if the WLAN terminal is on. In the event the WLAN terminal is off, the routine branches to S47 requesting the subscriber to activate the WV % LAN terminal and confirm activation. It should be noted that step S47 is substantially identical to corresponding step S32 shown in FIG. 7 and the identity of these steps is shown by placing "(S32)" adjacent to step S47. Steps S48 through S50 operate in substantially the same manner as steps S37 through S39 of FIG. 7 and are shown with the associated equivalent step number of FIG. 7 in parenthesis. Reference to performance to steps S48 to S50 should therefore be made to the description of steps S37 through S39 set forth above.

Making reference to step S50, the HSS in the UMTS is contacted after a predetermined interval (S45) responsive to completion of step S50.

When the WLAN terminal is identified as being on (S46) the target IP address is obtained (S51) and the rerouting process is performed (S52).

Figure 9:
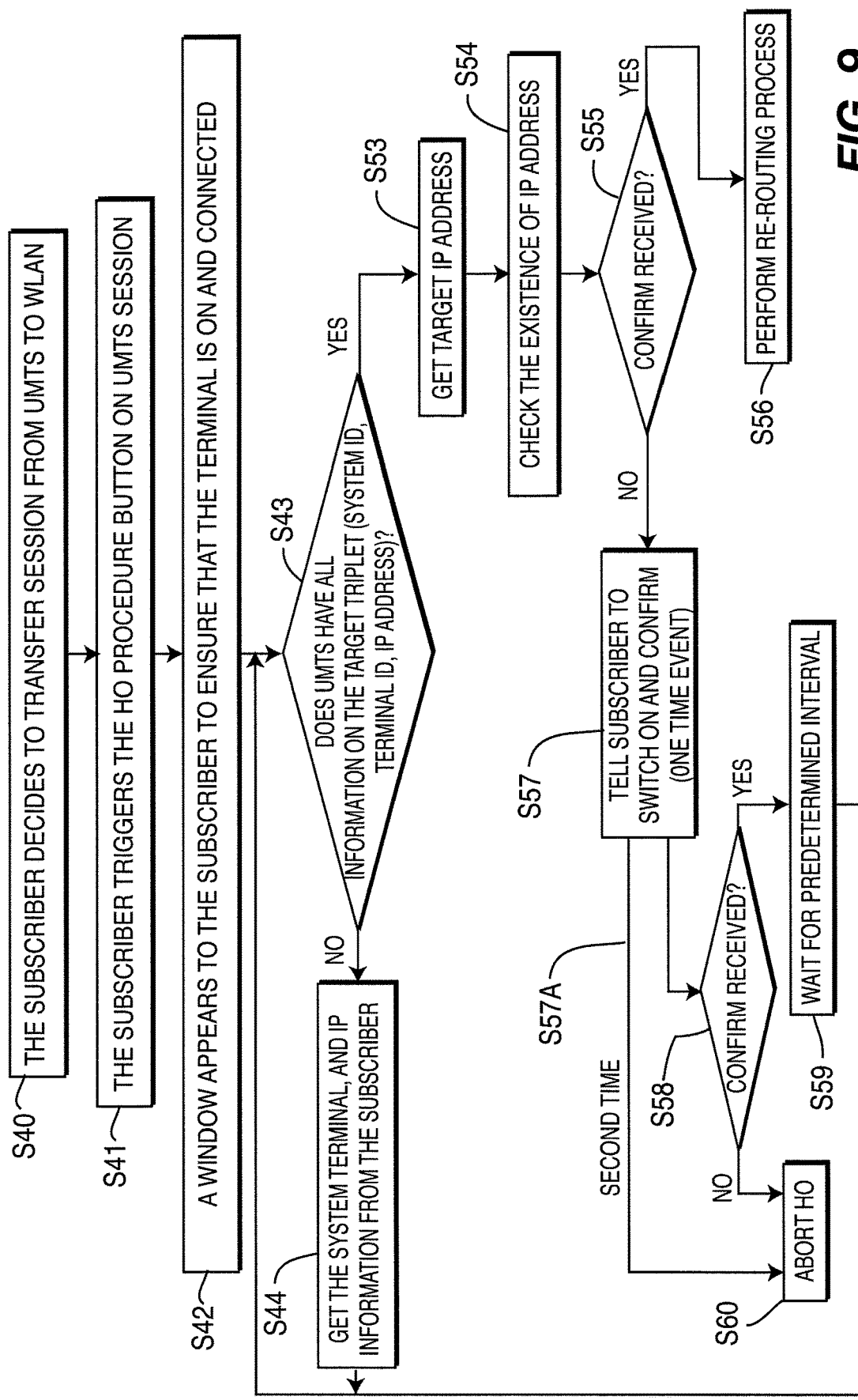
FIG. 9 is a method flow illustrating handover scenario from UMTS to WLAN (without Interworking).

FIG. 9 shows the scenario for HO from UMTS to WLAN without interworking. Making reference to FIG. 9, steps S40 through S43 are substantially identical to corresponding steps S40 through S43 shown in FIG. 8 and reference should be made to the description of these corresponding steps as set forth above.

In the event that the UMTS does not have the target information, the program branches to step S44 which is substantially similar to corresponding step 44 in FIG. 8 and the description thereof is set forth above.

Once the target information is obtained, the routine branches to S53 to extract the target IP address. The existence of the IP address is checked at step S54. If the confirmation is positive (S55), the rerouting process is performed (S56). In the event that confirmation has not been received, the routine branches to S57 to instruct the subscriber to turn the terminal on and provide information that these steps have been performed. At step S58, once the confirmation is received, the routine then branches to S59 and the routine returns to S43. Steps S43 through S55 are again repeated and in the event that confirmation is not received (S55), and this is the second inquiry, the routine branches at S57A whereupon the HO effort is aborted (S60).

What is claimed is:

1. A method for use in a source user equipment (UE), the method comprising:
   establishing a communication session via a first network of a first radio access technology (RAT) via a first base station (BS);
   obtaining connection information via the first network, wherein the connection information is associated with a target UE, and wherein the target UE is connected to a second network of a second RAT via a second BS;
   generating an inter UE transfer (IUT) request for an IUT of the communication session from the source UE to the target UE based on the connection information;
   transmitting the IUT request;
   transferring the communication session from the source UE to the target UE.

2. The method of claim 1, wherein the connection information associated with the target UE includes an address associated with the target UE, and the IUT request includes the address.

3. The method of claim 2, wherein the address is an internet protocol (IP) address.

4. The method of claim 1, wherein the IUT request is generated on a condition that the target UE is connected to a second network.

5. The method of claim 4, wherein the IUT request is generated based on a condition that the first network is of the first RAT and the second network is of the second RAT.

6. The method of claim 1, wherein the IUT request is generated in response to a link performance metric.

7. An apparatus comprising:
   a transceiver configured to establish a communication session with a first radio access technology (RAT) and configured to obtain connection information via a first network, wherein the connection information is associated with a target UE, and wherein the apparatus is connected to the first RAT via a first base station (BS) and the target UE is connected to the second RAT via a second BS; and
   a processor configured to generate an inter UE transfer (IUT) request for an IUT of the communication session from the apparatus to the target UE based on the connection information;
   wherein the transceiver is further configured to transmit the IUT request and wherein the communication session is transferred to the target UE.

8. The apparatus of claim 7, wherein the connection information associated with the target UE includes an address associated with the target UE, and the IUT request includes the address.

9. The apparatus of claim 8, wherein the address is an internet protocol (IP) address.

10. The apparatus of claim 7, wherein the processor is configured to generate the IUT request on a condition that the target UE is connected to a second network.

11. The apparatus of claim 10, wherein the processor is configured to generate the IUT request based on a condition that the first network is of the first RAT and the second network is of the second RAT.

12. The apparatus of claim 7 wherein the IUT request is generated in response to a link performance metric.

\* \* \* \* \*